(12) United States Patent
Deschenaux

(10) Patent No.: US 12,505,486 B2
(45) Date of Patent: Dec. 23, 2025

(54) UNIVERSAL SECURITIES WRAPPER

(71) Applicant: Marc R. Deschenaux, Geneva (CH)

(72) Inventor: Marc R. Deschenaux, Geneva (CH)

( * ) Notice: Subject to any disclaimer, the term of this patent is extended or adjusted under 35 U.S.C. 154(b) by 86 days.

(21) Appl. No.: 18/504,287

(22) Filed: Nov. 8, 2023

(65) Prior Publication Data

US 2024/0153009 A1 May 9, 2024

Related U.S. Application Data

(60) Provisional application No. 63/382,756, filed on Nov. 8, 2022.

(51) Int. Cl.
| | |
|---|---|
| *G06Q 40/06* | (2012.01) |
| *G06Q 20/02* | (2012.01) |
| *G06Q 20/06* | (2012.01) |

(52) U.S. Cl.
CPC ............ *G06Q 40/06* (2013.01); *G06Q 20/02* (2013.01); *G06Q 20/065* (2013.01); *G06Q 2220/00* (2013.01)

(58) Field of Classification Search
CPC ........................................................ H04L 9/50
USPC ........................................................ 705/36 R
See application file for complete search history.

(56) References Cited

U.S. PATENT DOCUMENTS

| | | | | |
|---|---|---|---|---|
| 11,900,455 | B1 * | 2/2024 | Lawrence | G06Q 40/06 |
| 2007/0233585 | A1 * | 10/2007 | Ben Simon | G07F 17/3244 |
| | | | | 705/35 |
| 2012/0246230 | A1 * | 9/2012 | Ferbar | G06Q 50/01 |
| | | | | 709/204 |
| 2016/0284233 | A1 * | 9/2016 | Whitehead | A63F 3/00072 |
| 2021/0158339 | A1 * | 5/2021 | Tollo | G06Q 20/3829 |
| 2022/0327529 | A1 * | 10/2022 | Williams | H04L 9/3213 |
| 2023/0119843 | A1 * | 4/2023 | Witham | G06F 21/64 |
| | | | | 705/75 |

OTHER PUBLICATIONS

International Search Report and Written Opinion in related International Application No. PCT/EP2023/081212 dated Jan. 23, 2024.

* cited by examiner

*Primary Examiner* — William E Rankins
(74) *Attorney, Agent, or Firm* — Reed Smith LLP; Lisa A. Chiarini; Richard J. Brown

(57) ABSTRACT

A distributed system using a decentralized ledger and method for generating, transferring, and redeeming fractionalized interests in digital assets such as fungible tokens.

16 Claims, 8 Drawing Sheets

UNIVERSAL SECURITIES WRAPPER

CROSS REFERENCE TO RELATED APPLICATION

This application claims the benefit of U.S. Provisional Application No. 63/382,756 filed Nov. 8, 2022, which is incorporated herein by reference in its entirety.

FIELD OF THE DISCLOSURE

This disclosure relates to systems and methods for generating, transferring, and redeeming fractionalized interests in assets. More particularly, this disclosure relates to systems and methods that may be used to manage fractionalized interests in assets using decentralized ledgers or distributed ledgers.

BACKGROUND

Fractionalized interests in business entities and commodities can be achieved through exchange traded funds and similar models, but such models may be subject to significant legal and regulatory requirements necessitated by the centralized management performed by employees, managers, officers, and directors. The compliance and personnel costs associated with centralized management of fractionally owned assets often renders fractional ownership cost-prohibitive.

Accordingly, there is a need for systems and methods that allow fractionalized interests in digital assets to be generated, transferred, and redeemed for the original asset, and which provide these benefits in a cost-effective manner.

SUMMARY

A first aspect provides a system for administering digital assets in a decentralized network, the system comprising a non-transitory computer readable medium and one or more processors, the system being configured to receive, from a first depositor account, a first set of one or more fungible tokens; generate a smart contract configured to, in response to receiving the first set of fungible tokens, generate a set of N1 fungible depositary tokens associated with the first set of fungible tokens, wherein N1 represents the number of depositary tokens collectively representing 100% of the ownership of the first set of fungible tokens; receive, from a first networked node, a first bid for one or more of the depositary tokens from a first investor; determine an amount of the depositary tokens to allocate to the first investor based on the first bid; allocate the amount of the depositary tokens to the first investor; wherein the system further comprises a distributed ledger for recording bids for the one or more of the depositary tokens and respective allocated depositary tokens, wherein the distributed ledger is accessible by the first networked node.

Embodiments of the system include the following, alone or in any combination.

The first set of fungible tokens may comprise a set of units of a cryptocurrency.

The smart contract may be accessible to the first networked node, wherein the smart contract further comprises a payout triggering event; and a plurality of predetermined electronic actions for generating a smart contract output when the payout triggering event is met, wherein the smart contract generates a payout to a user automatically when the payout event is triggered; and wherein the execution of the smart contract is recorded to the distributed ledger.

The payout triggering event may be based on revenue or income associated with monetization of the first set of fungible tokens.

The payout triggering event may be based on sale of a depositary token representing fractional ownership of the first set of fungible tokens and the payout is income associated with the sale and is paid to a depositor of the first set of fungible tokens.

The payout triggering event may be based on resale of a depositary token representing fractional ownership of the first set of fungible tokens by a first investor in the depositary token to another investor and the payout is income associated with the sale and is paid to the first investor.

The system may comprise a distributed network of nodes wherein the one or more processors are configured to execute the program instructions to cause the computing system to receive, from a plurality of networked nodes, a plurality of bids for one or more of the depositary tokens from a plurality of investors; determine an amount of the depositary tokens to allocate to each of the plurality of investors based on the respective bid from each of the plurality of investors; allocate the amount of depositary tokens to each of the plurality of investors; wherein the system further comprises a distributed ledger for recording bids for the one or more of the depositary tokens and respective allocated depositary tokens, wherein the distributed ledger is accessible by the plurality of networked nodes.

The system may be further configured to receive a plurality of $N''$ additional sets of fungible tokens from a plurality of depositor accounts; generate a plurality of $N''$ smart contracts, each configured to in response to receiving an additional set of fungible tokens, generate $N''$ additional sets of fungible depositary tokens, each additional set of depositary tokens comprising a number of depositary tokens which collectively represent 100% of the ownership of each additional set of fungible tokens; to provide a plurality of sets of depositary tokens, each set of which represents one of the plurality of additional sets of fungible tokens.

Each additional set of fungible tokens may comprise a set of units of a cryptocurrency.

Each smart contract may further comprise a payout triggering event; and a plurality of predetermined electronic actions for generating a smart contract output when the payout triggering event is met, wherein the smart contract generates a payout to a user automatically when the payout event is triggered; and wherein the execution of the smart contract is recorded to the distributed ledger.

The system may be further configured to aggregate the N1 depositary tokens and at least one set of $N''$ depositary tokens into a pool of depositary tokens; and generate a set of pooled depositary tokens, wherein each of the pooled depositary tokens comprises a fractionalized interest in the pool of depositary tokens representing a proportional amount of the N1 and $N''$ depositary tokens.

The payout triggering event may be based on revenue or income associated with monetization of the first set of fungible tokens or any of the $N''$ additional sets of fungible tokens.

Another aspect provides a non-transitory computer readable storage medium comprising program instructions embodied therewith; wherein the program instructions cause a distributed networked computer system for managing fungible tokens, the distributed network computer system comprising a distributed ledger and one or more processors configured to execute the program instructions to receive, from a first depositor account, a first set of one or more fungible tokens; generate a smart contract configured to, in response to receiving the first set of fungible tokens, generate a set of N1 fungible depositary tokens associated with the first set of fungible tokens, wherein N1 represents the number of depositary tokens collectively representing 100% of the ownership of the first set of fungible tokens; receive, from a first networked node, a first bid for one or more of the depositary tokens from a first investor; determine an amount of the depositary tokens to allocate to the first investor based on the first bid; allocate the amount of the depositary tokens to the first investor; wherein the system further comprises a distributed ledger for recording bids for the one or more of the depositary tokens and respective allocated depositary tokens, wherein the distributed ledger is accessible by the first networked node; wherein the smart contract may be accessible to the first networked node, wherein the smart contract further comprises a payout triggering event; and a plurality of predetermined electronic actions for generating a smart contract output when the payout triggering event is met, wherein the smart contract generates a payout to a user automatically when the payout event is triggered; and wherein the execution of the smart contract is recorded to the distributed ledger.

Embodiments of the non-transitory computer readable storage medium include the following, alone or in any combination.

The system may further comprise a distributed network of nodes and wherein the one or more processors are configured to execute the program instructions to cause the computing system to receive, from a plurality of networked nodes, a plurality of bids for one or more of the depositary tokens from a plurality of investors; determine an amount of the depositary tokens to allocate to each of the plurality of investors based on the respective bid from each of the plurality of investors; allocate the amount of depositary tokens to each of the plurality of investors; wherein the system further comprises a distributed ledger for recording bids for the one or more of the depositary tokens and respective allocated depositary tokens, wherein the distributed ledger is accessible by the plurality of networked nodes.

The computing system may receive a plurality of N″ additional sets of fungible tokens from a plurality of depositor accounts; generate a plurality of N″ smart contracts, each configured to, in response to receiving an additional set of fungible tokens, generate N″ additional sets of fungible depositary tokens, each additional set of depositary tokens comprising a number of depositary tokens which collectively represent 100% of the ownership of each additional set of fungible tokens; to provide a plurality of sets of depositary tokens, each set of which represents one of the plurality of additional sets of fungible tokens.

Each smart contract may further comprise a payout triggering event; and a plurality of predetermined electronic actions for generating a smart contract output when the payout triggering event is met, wherein the smart contract generates a payout to a user automatically when the payout event is triggered; and wherein the execution of the smart contract is recorded to the distributed ledger.

The system may be further configured to aggregate the N1 depositary tokens and each set of N″ depositary tokens into a pool of depositary tokens; and generate a set of pooled depositary tokens, wherein each of the pooled depositary tokens comprises a fractionalized interest in the pool of depositary tokens representing a proportional amount of the N1 and N″ depositary tokens.

Another aspect comprises a method for administering digital assets in a decentralized network, the method comprising, by a distributed network computer system comprising a distributed ledger; a non-transitory computer readable storage medium having program instructions embodied therewith; and one or more processors configured to execute the program instructions, the computer system receiving, from a first depositor account, a first set of, one or more fungible tokens; generating a smart contract configured to, in response to receiving the first set of fungible tokens, generate a set of N1 fungible depositary tokens associated with the first set of fungible tokens, wherein N1 represents the number of depositary tokens collectively representing 100% of the ownership of the first set of fungible tokens; receiving, from a first networked node, a first bid for one or more of the depositary tokens from a first investor; determining an amount of the depositary tokens to allocate to the first investor based on the first bid; allocating the amount of the depositary tokens to the first investor; recording bids for the one or more of the depositary tokens and respective allocated depositary tokens in the distributed ledger, wherein the distributed ledger is accessible by the first networked node; wherein the smart contract is accessible to the first networked node and the smart contract further comprises a payout triggering event; and a plurality of predetermined electronic actions for generating a smart contract output when the payout triggering event is met; generating by the smart contract a payout to a user automatically when the payout event is triggered; and recording execution of the smart contract to the distributed ledger.

Embodiments of the non-transitory computer readable storage medium include the following, alone or in any combination.

The computer system may further comprise a distributed network of nodes, the computer system receiving, from a plurality of networked nodes, a plurality of bids for one or more of the depositary tokens from a plurality of investors, determining an amount of the depositary tokens to allocate to each of the plurality of investors based on the respective bid from each of the plurality of investors; and allocating the amount of depositary tokens to each of the plurality of investors; wherein the system further comprises a distributed ledger for recording bids for the one or more of the depositary tokens and respective allocated depositary tokens, wherein the distributed ledger is accessible by the plurality of networked nodes.

The method may further comprise receiving a plurality of N″ additional sets of fungible tokens from a plurality of depositor accounts; generating a plurality of N″ smart contracts, each configured to, in response to receiving an additional set of fungible tokens, generate N″ additional sets of fungible depositary tokens, each additional set of depositary tokens comprising a number of depositary tokens which collectively represent 100% of the ownership of each additional set of fungible tokens; providing a plurality of sets of depositary tokens, each set of which represents one of the plurality of additional sets of fungible tokens.

Also provided is a system for administering digital assets in a decentralized network, the system comprising a non-transitory computer readable medium, one or more processors, a distributed network of nodes and a distributed ledger accessible by the plurality of networked nodes, the system being configured to receive a plurality of N″ sets of fungible tokens from a plurality of depositor accounts; generate a plurality of N″ smart contracts, each configured to, in response to receiving one of the N″ sets of fungible tokens, generate a set of fungible depositary tokens, each set of depositary tokens comprising a number of depositary tokens which collectively represent 100% of the ownership of each set of fungible tokens; to provide a plurality of $N''$ sets of depositary tokens, each set of which represents one of the plurality of sets of $N''$ fungible tokens; receive, from the plurality of networked nodes, a plurality of bids for one or more of the depositary tokens from a plurality of investors, determine an amount of the depositary tokens to allocate to each of the plurality of investors based on the respective bid from each of the plurality of investors; allocate the amount of depositary tokens to each of the plurality of investors; record bids for the one or more of the depositary tokens and respective allocated depositary tokens to the distributed ledger; wherein each smart contract further comprises defining a payout triggering event based on revenue or income associated with monetization of any of the $N''$ sets of fungible tokens; and a plurality of predetermined electronic actions for generating a smart contract output when the payout triggering event is met, wherein the smart contract generates a payout to a user automatically when the payout event is triggered; and execution of the smart contract is recorded to the distributed ledger.

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

DETAILED DESCRIPTION

Figure 1A:
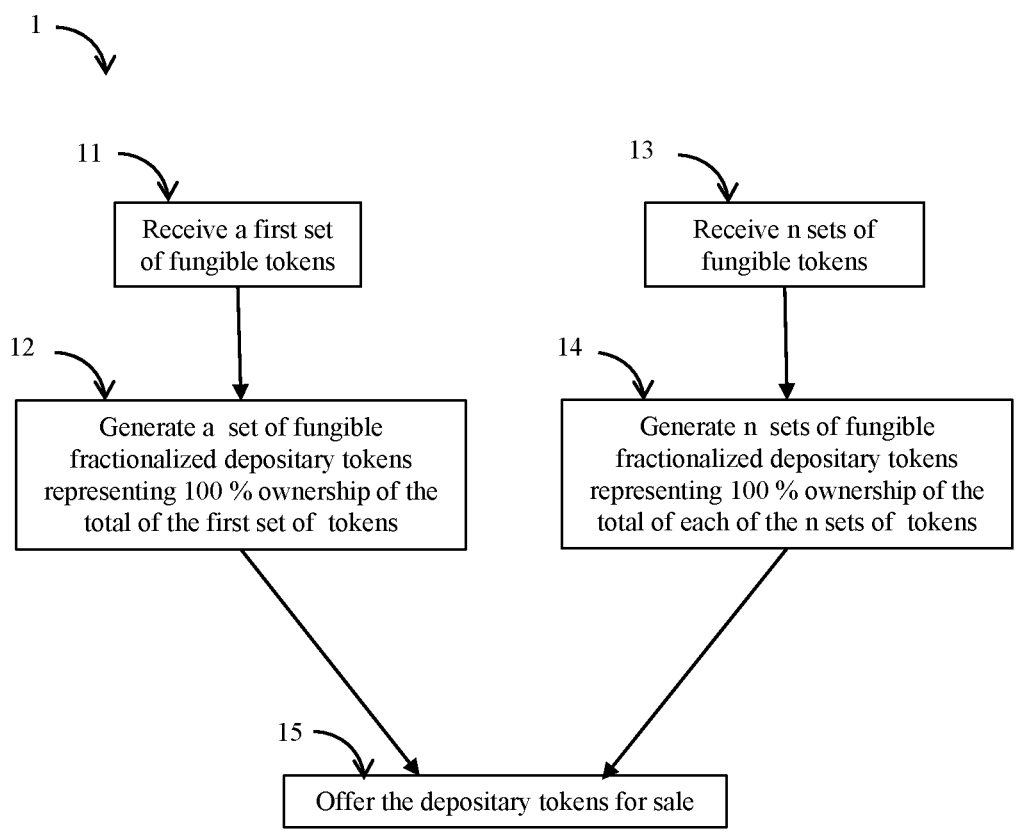
FIGS. 1A-C show aspects of an exemplary system for generating fractionalized interests in digital assets such as fungible tokens, according to an exemplary embodiment of the disclosed subject matter.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

In some embodiments, a distributed ledger and/or smart contract system may be provided which allows for ownership of digital assets to be fractionalized and recorded. This may be achieved, for example, fractionalizing ownership using a smart contract deployed to the distributed ledger. By eschewing centralized management, it may be possible to provide for fractionalized, tradeable interests in assets without necessitating substantial regulatory compliance expenditures.

A fungible token may be created to digitally represent fungible items such as gold, fiat currency, or any other commodity in the physical world. Fungible tokens allow transactions to be conducted without physically moving fungible items that the tokens represent. A fungible token may also comprise a unit of cryptocurrency. However, because the number of units of a given cryptocurrency (for example, Bitcoin) is limited, the per-unit price of a cryptocurrency may be large enough to prevent small investors from investing in a cryptocurrency. Given that a fungible token is flexible such that it can be exchanged for another of its kind without losing value, a smart contract can be deployed to generate a second set of fungible tokens or depositary tokens linked to a first fungible token. In this way, anyone who holds any of the generated depositary tokens can own a percentage of a more highly valued first fungible token. The depositary tokens can be generated based on a percentage of the value of the asset identified by the first fungible token, such that the number of depositary tokens represents a defined percentage of the ownership of the NFT and may be priced initially based on the percentage of the value of the first token at the time of their creation.

Once fractional ownership of a first fungible token is created, the smart contract can secure the data that differentiates the fractional first fungible token from other fungible tokens. The fractionalized fungible tokens, or depositary tokens can be applied on a distributed network, such as a blockchain, that supports smart contracts and tokens such that the first fungible token is locked in a smart contract on the blockchain and ownership of the first fungible token is represented by multiple fungible depositary tokens whose supply is governed by the smart contract.

Depositary tokens enable price discovery of fungible tokens. Price discovery is the process through which a market goes through to set the proper price of an asset. Sale of at least a portion of the depositary tokens allows for a market valuation for an asset represented by a fungible token based on the bid and sale prices of the depositary tokens. With depositary tokens, democratized ownership is a possibility such that even as the bidding price of a given type of fungible token increases, market activity around that token remains relatively high as more people can participate at lower prices. Even if one of the owners of depositary tokens decides to sell, their move won't affect the overall value held by other stakeholders. Depositary tokens may also bring about more liquidity to the fungible token marketplace. The reduced fungibility of highly valued fungible tokens may ultimately lead to a lack of liquidity on fungible token marketplaces. With depositary tokens, liquidity can be sustained whereby smaller investors can participate as opposed to only having the participation of a few deep-pocketed investors. The fungible depositary tokens created by the smart contract to represent ownership in the fractionalized fungible tokens can be traded on other secondary platforms to further add liquidity.

Disclosed herein is a system architecture for creating, trading and administering fractionalized fungible tokens. The system may be considered a token investment trust, where sets of fungible tokens can be deposited, traded and monetized by a plurality of investors using depositary tokens representing fractional ownership of fungible tokens.

Figure 1B:
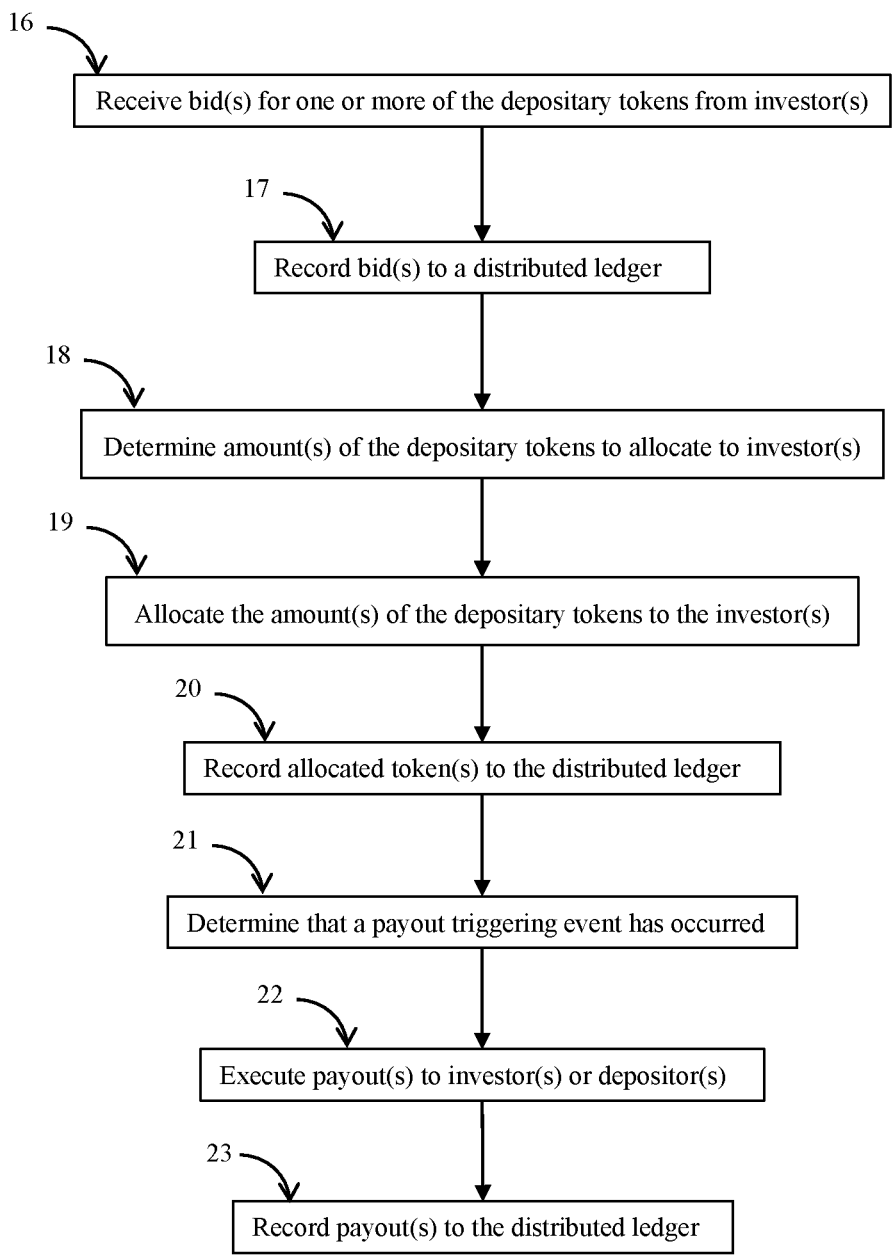
Figure 1C:
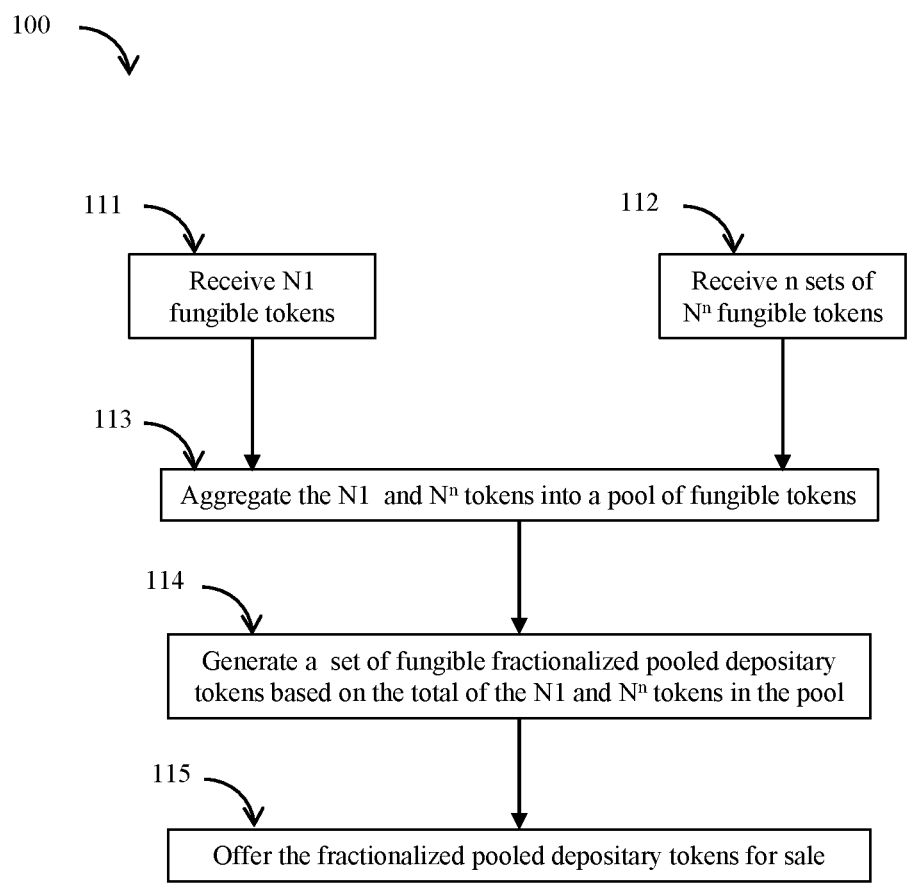

FIGS. 1A-C show aspects of an exemplary system for generating fractionalized interests in digital assets such as fungible tokens. The system, described herein as a token trust, is a distributed platform for depositing fungible tokens, creating fractional depositary tokens representing the fungible tokens, trading the depositary tokens and distributing payouts to inventors in the depositary tokens.

FIG. 1A shows a process 1 for generating depositary tokens based on fungible tokens. In block 11, the computer system receives a first set of fungible tokens from an account linked to a depositor who deposits the fungible tokens into the system by uploading data uniquely identifying the deposited fungible tokens. In block 12, the system generates a set of fungible fractionalized depositary tokens representing 100% ownership of the total of the first set of tokens deposited into the system. The depositary tokens are also defined so that the value of the entire set of depositary tokens represents the value of the deposited tokens at the time of their deposit. The amount of depositary tokens may be generated autonomously based on targets defined by administrators of the computer system. In example embodiments, a target may be determined by defining price points for each depositary token to permit a small investor to participate in the market for the first set of fungible tokens.

For illustration, if the first set of deposited tokens comprises three tokens each valued at $10,000 in fiat currency, they have a total valuation of $30,000. An initial target price for depositary tokens based on the set of fungible tokens may be determined to be $30, so the system may generate 1000 depositary tokens each representing 0.1% ownership in the set of fungible tokens, each priced at $30 per depositary token.

The system is scalable, in that a plurality of fungible tokens can be deposited and fractionalized. In block 13, a plurality of n sets of fungible tokens are deposited (where n represents an indeterminate integral number), which may be from a plurality of depositors. The plurality of deposited fungible tokens may comprise different assets such as different types of cryptocurrencies and/or different numbers of tokens in the set, each independently valued from other fungible tokens.

In block 14, depositary tokens are generated for each of the plurality of sets of fungible tokens. As discussed for block 12, $N''$ depositary tokens (wherein $N''$ is the number of depositary tokens generated for each of the n sets of fungible tokens) are generated for each set of fungible tokens based at least in part on financial targets for fractionalizing the fungible tokens in each set.

In block 15, the depositary tokens are offered for sale to investors.

FIG. 1B shows additional steps in the process of administering the token trust. After the depositary tokens are offered for sale in block 15, the system receives bid(s) for one or more of the depositary tokens from one or a plurality of investor(s) in block 16. The bids may be based on type(s) of fungible toke represented by depositary tokens, target spending amount(s) for the investor(s), etc. The bids are recorded in the distributed ledger in block 17.

In block 18, the system determines amount(s) of the depositary tokens to allocate to investor(s), which may be based on comparison of bid prices for the depositary tokens, the number of tokens available, etc. In block 19, the tokens are allocated to investors. The allocation may include negotiation between investors and the system to reach agreement on the price and amount of tokens in the deal, accepting the final bid, receiving payment from the investors. The allocation is conducted within the framework of a smart contract, which defines the purchase of tokens by investors. In block 20, the allocated depositary tokens are recorded to the distributed ledger.

The smart contract may also include a payout triggering event and a plurality of predetermined electronic actions for generating a smart contract output when the payout triggering event is met, wherein the smart contract generates a payout to a depositor or investor automatically when the payout event is triggered. In block 21, the system determines that a payout event has occurred. The payout event may include a sale of a depositary token, revaluation of a deposited fungible token based on sales of like fungible tokens within or outside the token trust system, etc.

In block 22, the system execute payouts to investors or depositors. For example, when depositary tokens are sold for a first time, the payout may be directed to the depositor of the tokens underlying the sold depositary tokens. Subsequent sales of depositary tokens means the payout is directed to the investor holding the depositary tokens. Other payout events may be envisioned.

In block 23, the payout is recorded to the distributed ledger. This includes updating the smart contract to reflect the altered state of the depositary tokens, such as their ownership and current price.

FIG. 1C shows a process 100 for aggregating deposited fungible tokens into pooled depositary tokens wherein the pooled depositary tokens represent proportional fractionalized ownership of the pooled fungible tokens. In block 111 a first set of fungible tokens is deposited as described above for block 11. One or a plurality of additional sets of fungible tokens are deposited in block 112 as described above for block 12.

In block 113, the N1 fungible tokens and at least one set of $N''$ tokens are aggregated into a pool of fungible tokens.

In block 114, the system generates a set of fungible fractionalized pooled depositary tokens based on the total of the N1 and $N''$ tokens in the pool. In some embodiments, the pool may aggregate sets of like tokens deposited by a plurality of depositors, so that the pooled depositary tokens represent fractionalized ownership of the total of tokens in the pool in a larger pool of tokens. The pooled depositary tokens are defined to trace back to the originally deposited tokens.

In other embodiments, different types of fungible tokens may be pooled. The system determines an independent value for the N1 tokens and each of the $N''$ tokens in the pool such that the values of the tokens in the pool are proportionally represented. For illustration, the first set of N1 deposited tokens may have a total valuation of $30,000 and the additional $N''$ tokens may have a total valuation of $10,000 and the number of N1 tokens and $N''$ tokens in the pool are equal. Accordingly, depositary tokens for the pooled fungible tokens will have a total valuation of $40,000 and he fractionalized ownership share in the N1 tokens and $N''$ tokens in the pooled depositary tokens would be equal. In this illustration, the pooled depositary tokens may be sold at $40 per token, wherein each depositary token represents 0.1% ownership of the N1 and N tokens.

One can appreciate that if the number of N1 and $N''$ tokens and their valuations are unequal, generation of the pooled depositary tokens may be more complex, such that the system may test a number variables to define the final structure of the pooled depositary tokens.

In block 115, the fractionalized pooled depositary tokens are offered for sale. The pooled depositary tokens are available for bids from investors as in block 16 and further managed according to the blocks in FIG. 1B.

Figure 2A:
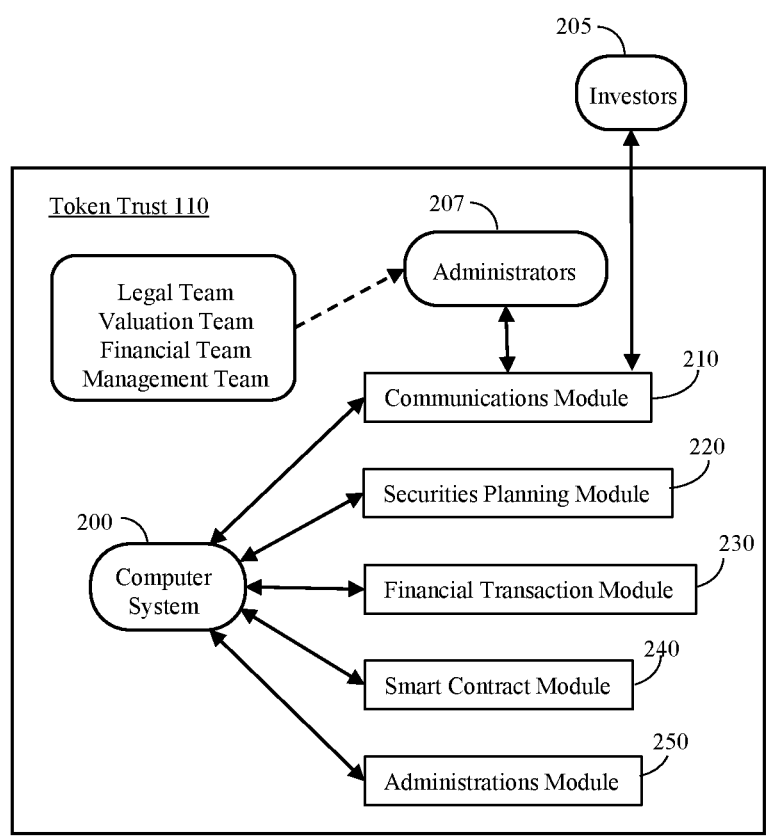
FIGS. 2A and 2B depict schematic functional diagrams of a computer system architecture of an exemplary system for generating fractionalized interests in digital assets such as fungible tokens according to an exemplary embodiment of the disclosed subject matter.

As shown in FIG. 2A, a computer system 200 is a core element of the token trust architecture, receiving, generating, storing, integrating and coordinating data required for receiving fungible tokens from depositors, defining fractionalized depositary tokens for fungible tokens, receiving investment payments from a plurality of investors 205, matching bids from the plurality of investors, optionally generating smart contracts among investors and the company or issuer, determining revenues related to the fungible tokens and administering payouts to investors. The computer system is further provided with at least one processor and into which is loaded software components for receiving informational inputs from the plurality of investors via communications module or interface 210.

Block 210 represents a communication module, which manages inputs from users, and transmits outputs to the users. Users may include depositors or sellers of fungible token assets, administrators and investors. Inputs from depositors include amounts and current values of fungible tokens to be deposited and the digital data associated with the fungible tokens. Inputs from investors include investing information, investor identity, designation of a payment vehicle or digital "wallet", such as a credit or debit account, including credit or debit cards issued by a financial institution, Venmo© or Pay Pal© apps, etc. Communications module 210 may also be used by administrator(s) 207 of the computer system to communicate with the system. Administrator(s) may provide inputs to the system to maintain and manage the system to make sure it is operating correctly. In embodiments, the administrator(s) 207 may also provide inputs to the system to designate fungible assets for investors to invest in, risks assessments, projected revenue streams, etc.

Figure 2B:
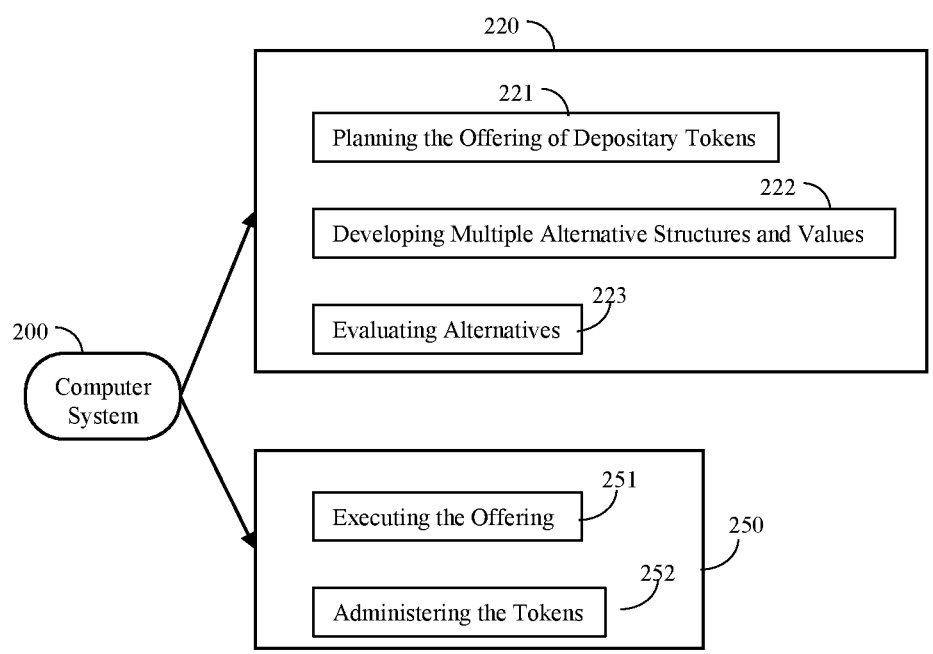

In block 220, the system includes a securities planning module in which the depositary tokens are defined, as described in greater detail in regard to FIG. 2B.

Block 230 comprises the financial transactions module that manages payments from investors to cover their bids, payments to investors and collection of transaction fees. In embodiments, once a bid is accepted, the financial transactions module may withdraw the bid amounts plus transaction fees from investors' payment vehicles in response to acceptance of bids by the computer system. Block 230 also receives payments from the revenue streams associated with the fungible tokens deposited into the system and disburses payments to the investors based on the terms of the smart contract.

In embodiments, the tokens may be offered in the form of a smart contract, described in greater detail below. In block 240, the smart contract module executes smart contracts by generating data blocks defining the fungible tokens, and depositary tokens including all terms and conditions binding on the investors and the depositors such as purchase prices, revenue streams from the associated with the tokens, percentages of the revenue streams represented by the tokens, etc.

Block 250 shows the administration module, which executes and administers the tokens.

As shown in FIG. 2B, block 220 comprises aspects of defining the depositary token offerings.

In block 221, planning the offering of tokens includes establishing the target amount of depositary tokens to be sold and a price for each token. Guided by inputs from administrator(s) of the system representing the seller, bank, broker, underwriter and/or other financial institutions, the system conducts feasibility studies for offering tokens to define the structure of the offering. The offering planning includes specific variables to be included, ranges of acceptable values for each variable, and terms and conditions to be included in the offering.

In block 222, the system models and projects multiple values of individual variables and combinations of multiple sets of variables, such as time series projections and economic modeling of interaction among variables.

In block 223, the system evaluates alternatives by reviewing results of modeling and projections. Selecting one or more sets of variables that meet targets will be used to refine the structure and value of variables and terms and conditions for price categories of the tokens. Additional modeling and projections may be required to define a preferred set of values for the variables and terms and conditions for inclusion in the offering of tokens.

FIG. 2B also shows block 250 comprising aspects of administering the token offerings.

In block 251, the system executes the offering of the depositary tokens. The price and content of the individual depositary tokens are established, including definitions of shares of revenues and assets to be included in each offering. Technical and legal details are finalized and the tokens are brought to market. The system receives and accepts bids for tokens from at least one investor, tracks progress of sales of tokens, and closes sales when target values are met. The system may also receive sell orders from holders of tokens and sell them to new investors.

Block 251 may comprise an order creation module. In general, the order creation module may have two modes of functionality. In a first mode, the order creation module permits a buyer to search a database of specified token sets and to select one or more tokens from the inventory of depositary tokens for pricing by a selected group of sellers. It will be understood from the following disclosure that, although multiple token types may be selected, any number of token sets less than the total number selected (or none at all) may be quoted and ultimately traded. In a second mode, a buyer is provided with the option to select the characteristics of a desired specified pool. These characteristics may be transmitted through system 200 to one or more sellers. The sellers can identify one or more pools in their respective inventories that substantially meet the buyer's specified set of characteristics or agree to create a specified pool meeting such characteristics.

In operation, by setting various criteria and through selection of one or more sellers, through the operation of the order creation module, buyers can create a customized inventory query which will return available asset securities from database(s) in the system. In the alternative, the query can be submitted directly to the seller in order to determine whether the seller has or can stipulate to a token offering meeting the buyer's requirements. This feature may be used when a token meeting the buyer's requirements is not in the inventory of one or more sellers.

In an alternative embodiment, wherein one or more desired tokens are not in an inventory of offered tokens, a buyer may be enabled to send an inquiry message to one or more sellers inquiring as to the availability of a token meeting the buyer's needs. In this embodiment, a buyer typically creates an order query using system 200's order creation module to determine whether the desired fungible tokens are listed in the system's database of tokens previously populated by one or more sellers. Such query details may include, identifier(s) of assets, a pool number of an asset pool, a weighted average maturity, a constant payment rate, an originator identifier, etc. While the buyer may use various inventory filters to enable the buyer to search for tokens meeting defined criteria, in some instances, a token having the desired criteria may not be available. In those instances, the buyer can define the criteria according to which an inquiry message will be generated and transmitted to one or more sellers. A dealer or agent list may include a list of dealers, acting as sellers, and aspects of the buyer interface enable the buyer to select the dealers to which the inquiry message will be transmitted. Once the buyer completes the process of inputting desired criteria and selecting dealers, the criteria and dealer data is transmitted to and received by system 200. System 200 then generates an inquiry message which includes the characteristics for the pool of tokens defined by the buyer. The data in the inquiry message is then transmitted to the selected dealer(s)

In block 252, the system administers the depositary tokens in the offering. It maintains detailed and current records of individual depositor and investor accounts as required for periodic and cumulative payments, tax treatment, benefits, reports and other purposes. It maintains required and useful records related to financial analysis and financial reports of investors, brokers, and other involved parties. In embodiments, the records may be recorded in a distributed ledger such as a blockchain.

In embodiments, the offering, sale and administration of the tokens may be conducted as a smart contract.

A smart contract is a computer application simulating the operation of a contract. It is a computer program or a transaction protocol which is intended to automatically execute, control or document legally relevant events and actions according to the terms of a contract or an agreement between or among parties. The objectives of smart contracts are the reduction of need in trusted intermediators, arbitrations and enforcement costs, fraud losses, as well as the reduction of malicious and accidental exceptions. The smart contract is stored on a distributed ledger such as a blockchain that runs when predetermined conditions are met. Distributed ledger technology (DLT) is a digital system for recording the transaction of assets in which the transactions and their details are recorded in multiple places at the same time. Unlike traditional databases, distributed ledgers have no central data store or administration functionality. They may be used to automate the execution of an agreement so that all participants can be immediately certain of the outcome, without any intermediary's involvement or time loss.

The reliability of the smart contract comes from its automaticity which gives it a power of execution unmatched to date.

A smart contract also can be regarded as a secured stored procedure as its execution and codified effects like the transfer of some value between parties are strictly enforced and cannot be manipulated, after a transaction with specific contract details is stored into a blockchain or distributed ledger. That is because the actual execution of contracts is controlled and audited by the platform, not by any arbitrary server-side programs connecting to the platform. Smart contracts are particularly useful for managing exchanges of virtual financial or value assets, where no tangible materials need to be moved.

Blockchain is a distributed ledger technology that enables a set of peers to work together to create a unified, decentralized network. The peers can communicate and share information or data with the help of a consensus algorithm. There is no need for a centralized authority, which makes the whole network trustworthy when compared to other networks. When one peer sends information to another, a transaction is generated in the form of a "block". Blocks are used to store transactions and other important information that is required to operate the blockchain successfully. When this happens, the transactions need to be validated using the consensus algorithm. Proof of Work is used to validate the work. It ensures that no invalid transactions are passed into the blockchain. Timestamps are created to ensure that each transaction can be traced, backed, and verified by anyone. The blockchain provides transparency, immutability, and security.

The contracting parties program the contractual terms, payments to be made and all dispatches of documents used for the execution of the contract in the software application and may no longer retract their commitments. Once launched, the application performs the scheduled operations without human intervention, as scheduled or triggered by a defined triggering event.

End clients interact with a smart contract through transactions. Such transactions with a smart contract can invoke other smart contracts. These transactions might result in changing the state and sending financial assets from one smart contract to another or from one account to another. Financial assets can include nationally denominated currencies, cryptocurrencies, virtual stock certificates, or other asset whose value can be defined digitally.

Similar to a transfer of value on a blockchain, deployment of a smart contract on a blockchain occurs by sending a transaction from a wallet for the blockchain. The transaction includes the compiled code for the smart contract as well as a special receiver address. That transaction must then be included in a block that is added to the blockchain, at which point the smart contract's code will execute to establish the initial state of the smart contract. Byzantine fault-tolerant algorithms secure the smart contract in a decentralized way from attempts to tamper with it. Once a smart contract is deployed, it cannot be updated. Smart contracts on a blockchain can store arbitrary state and execute arbitrary computations.

The reliability of the smart contract can be greatly increased by relying on a decentralized IT environment allowing secure access to the contractors and unfalsifiable by them.

Each smart contract may include information about the investment in the depositary tokens. Such information may include the amount of the investment, the agreed-upon payouts, triggering events, the revenue stream, the time the investment is agreed upon, the identities of the parties, etc. Investment information may further include conditional outcomes based upon each potential outcome, including the facilitation of payment from the seller to the investor, and/or the return of funds in event of a void or cancellation. In some embodiments, a settlement service may be agreed upon among the parties.

Some embodiments provide that the smart contracts may be generated on individual PC's, on a mobile device and/or in the cloud. Such examples are non-limiting as the smart contracts may be generated at a variety of other devices and/or types thereof. In some embodiments, each smart contract may involve external services at the discretion of the parties. In some embodiments, a range of options may be selected by the parties at the time the smart contract is generated.

Some embodiments provide that a smart contract may be registered with a settlement service provider that is agreed to by the parties. In some embodiments, the settlement service may operated by the administrators of the system 200. In some embodiments, the settlement service may send information to the counterparties, which may trigger the payouts under the terms of the smart contract. For example, the settlement service provider may initiate a bank transfer from the seller to the buyer based on the smart contract or from the payer of the revenue directly to the investor. In some embodiments, the process may be automated by software on a computer and/or server controlled by the settlement service. Embodiments herein do not require the funds to be held in any kind of escrow, however, such option is contemplated by this disclosure. For example, embodiments herein are directed to any financial settlement process that may be used in conjunction with the smart contracts as disclosed herein.

Some embodiments provide that the settlement transaction may be stored in blockchain to close the contract. In some embodiments, details corresponding to the settlement transaction may be retained for auditing, later scrutiny and/or to ensure that no errors are made.

Figure 3:
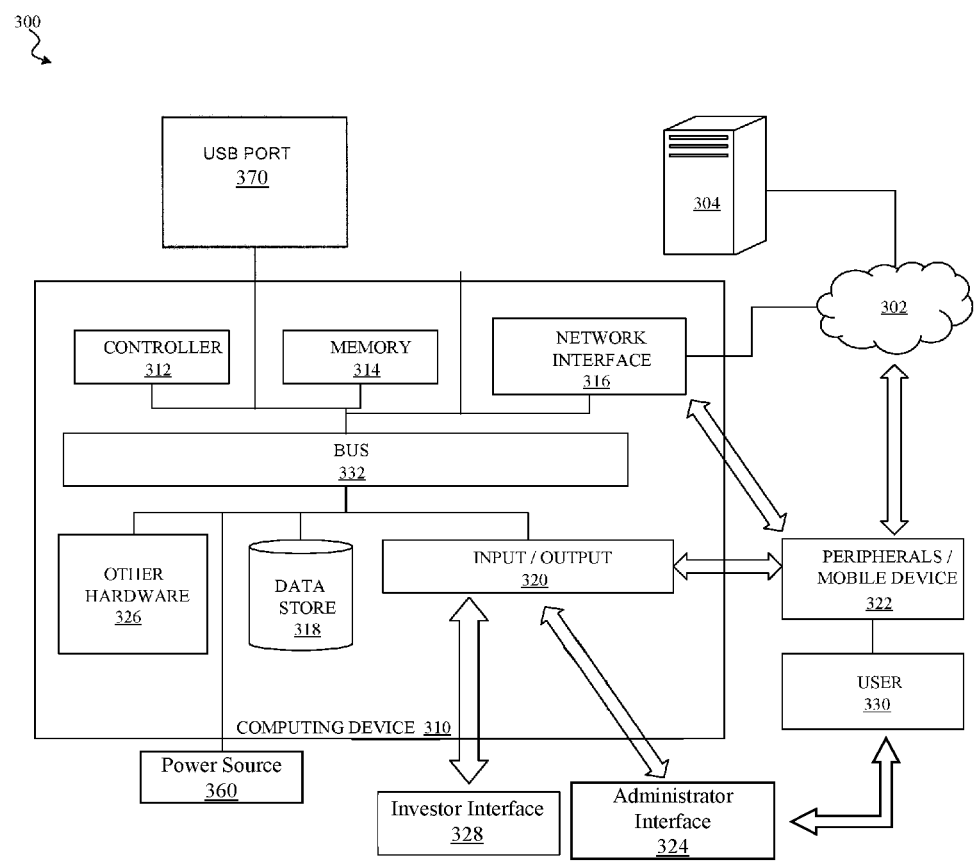
FIG. 3 depicts a functional diagram of components of a computer system according to an exemplary embodiment of the disclosed subject matter.

FIG. 3 depicts a computer system 300 according to an embodiment of the present disclosure. In general, the computer system 300 may include a computing device 310, such as a special-purpose computer designed and implemented for receiving user inputs, determining and directing and controlling the output of signals. The computing device 310 may be or include data sources, client devices, and so forth. In certain aspects, the computing device 310 may be implemented using hardware or a combination of software and hardware. The computing device 310 may be a standalone device, a device integrated into another entity or device, a platform distributed across multiple entities, or a virtualized device executing in a virtualization environment.

The computing device 310 may communicate across a network 302. The network 302 may include any data network(s) or internetwork(s) suitable for communicating data and control information among participants in the computer system 300. This may include public networks such as the Internet, private networks, and telecommunications networks such as the Public Switched Telephone Network or cellular networks using cellular technology and/or other technologies, as well as any of a variety other local area networks or enterprise networks, along with any switches, routers, hubs, gateways, and the like that might be used to carry data among participants in the computer system 300. The network 302 may also include a combination of data networks and need not be limited to a strictly public or private network.

The computing device 310 may communicate with an external device 304. The external device 304 may be any computer, mobile device such as a cell phone, tablet, smart watch or other remote resource that connects to the computing device 310 through the network 302. This may include any of the servers or data sources described herein, including servers, content providers, databases or other sources for shot information to be used by the devices as described herein.

In general, the computing device 310 may include at least one controller or processor 312, a memory 314, a network interface 316, a data store 318, and one or more input/output interfaces 320. The computing device 310 may further include or be in communication with peripherals 322 and other external input/output devices that might connect to the input/output interfaces 320.

The controller 312 may be implemented in software, hardware or a combination of software and hardware. According to one aspect, the controller 312 may be implemented in application software running on a computer platform. Alternatively, the controller 312 may include a processor or other processing circuitry capable of processing instructions for execution within the computing device 310 or computer system 300. The controller 312, as hardware, may include a single-threaded processor, a multi-threaded processor, a multi-core processor and so forth. The controller 312 may be capable of processing instructions stored in the memory 314 or the data store 318.

The memory 314 may store information within the computing device 310. The memory 314 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 314 may store program instructions, program data, executables, and other software and data useful for controlling operation of the computing device 310 and configuring the computing device 310 to perform functions for a user 330. The memory 314 may include a number of different stages and types of memory for different aspects of operation of the computing device 310. For example, a processor may include on-board memory and/or cache for faster access to certain data or instructions, and a separate, main memory or the like may be included to expand memory capacity as desired. All such memory types may be a part of the memory 314 as contemplated herein.

The memory 314 may, in general, include a non-volatile computer readable medium containing computer code that, when executed by the computing device 310 creates an execution environment for a computer program in question, e.g., code that constitutes processor firmware, a protocol stack, a database management system, an operating system, or a combination of the foregoing, and that performs some or all of the steps set forth in the various flow charts and other algorithmic descriptions set forth herein. While a single memory 314 is depicted, it will be understood that any number of memories may be usefully incorporated into the computing device 310.

The network interface 316 may include any hardware and/or software for connecting the computing device 310 in a communicating relationship with other resources through the network 302. This may include remote resources accessible through the Internet, as well as local resources available using short range communications protocols using, e.g., physical connections (e.g., Ethernet), radio frequency communications (e.g., Wi-Fi, Bluetooth), optical communications (e.g., fiber optics, infrared, or the like), ultrasonic communications, or any combination of these or other media that might be used to carry data between the computing device 310 and other devices. The network interface 316 may, for example, include a router, a modem, a network card, an infrared transceiver, a radio frequency (RF) transceiver for receiving AM/FM or satellite radio sources, a near field communications interface, a radio-frequency identification (RFID) tag reader, or any other data reading or writing resource or the like.

The network interface 316 may include any combination of hardware and software suitable for coupling the components of the computing device 310 to other computing or communications resources. By way of example and not limitation, this may include electronics for a wired or wireless Ethernet connection operating according to the IEEE 802.11 standard (or any variation thereof), or any other short- or long-range wireless networking components or the like. This may include hardware for short range data communications such as Bluetooth or an infrared transceiver, which may be used to couple to other local devices, or to connect to a local area network or the like that is in turn coupled to a data network 302 such as the Internet. This may also include hardware/software for a WiMax connection or a cellular network connection (using, e.g., CDMA, GSM, LTE, or any other suitable protocol or combination of protocols). The network interface 316 may be included as part of the input/output devices 320 or vice-versa.

The data store 318 may be any internal or external memory store providing a computer-readable medium such as a disk drive, an optical drive, a magnetic drive, a flash drive, or other device capable of providing mass storage for the computing device 310. The data store 318 may store computer readable instructions, data structures, program modules, and other data for the computing device 310 or computer system 300 in a non-volatile form for relatively long-term, persistent storage and subsequent retrieval and use. For example, the data store 318 may store an operating system, application programs, program data, databases, files, and other program modules or other software objects and the like. At least a portion of the data store 318 may be implemented in a distributed ledger technology such as a blockchain to record transaction information and smart contracts.

As used herein, processor, microprocessor, and/or digital processor may include any type of digital processing device such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die or distributed across multiple components.

As used herein, computer program and/or software may include any sequence or human or machine cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

The input/output interface 1320 may support input from and output to other devices that might couple to the computing device 1310. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also include an infrared interface, RF interface, magnetic card reader, or other input/output system for wirelessly coupling in a communicating relationship with other local devices. It will be understood that, while the network interface 316 for network communications is described separately from the input/output interface 320 for local device communications, these two interfaces may be the same, or may share functionality, such as where a USB port 370 is used to attach to a Wi-Fi accessory, or where an Ethernet connection is used to couple to a local network attached storage. The input/output interface 320 may further output signals to displays of peripheral devices, as described herein.

As used herein, a user 330 is any human that interacts with the computer system 300. In this context, a user may be generally classed within one of several categories. One category is a depositor that deposits fungible tokens into the token trust. Another category is an administrator of the system, representing the depositor/seller and/or financial institution (issuer) organizing and conducting the offering of the tokens. Another category is an investor who buys and sells tokens.

In certain embodiments the I/O interface 320 facilitates communication with input and output devices for interacting with a user. For example, the I/O interface may communicate with one or more devices such as a user-input device and/or a display 350 which may be instantiated on the device described herein or on a separate device such as a mobile device 208, which enable a user to interact directly with the controller 312 via bus 332. The user-input device may comprise one or more push-buttons, a touch screen, or other devices that allows a user to input information. In these embodiments, the computer system may further comprise a display to provide visual output to the user. The display may comprise any of a variety of visual displays, such as a viewable screen, a set of viewable symbols or numbers, and so on. One can appreciate that the inputs and outputs of the computer system would be different for administrators and investors. Accordingly, the computing device 310 may communicate administrators and investors with different interfaces 324 and 328.

A peripheral 322 may include any device used to provide information to or receive information from the computing device 310. This may include human input/output (I/O) devices such as a keyboard, a mouse, a mouse pad, a track ball, a joystick, a microphone, a foot pedal, a camera, a touch screen, a scanner, or other device that might be employed by the user 330 to provide input to the computing device 310. This may also or instead include a display, a printer, a projector, a headset or any other audiovisual device for presenting information to a user. The peripheral 322 may also or instead include a digital signal processing device, an actuator, or other device to support control of or communication with other devices or components. In one aspect, the peripheral 322 may serve as the network interface 316, such as with a USB device configured to provide communications via short range (e.g., Bluetooth, Wi-Fi, Infrared, RF, or the like) or long range (e.g., cellular data or WiMax) communications protocols. In another aspect, the peripheral 322 may augment operation of the computing device 310 with additional functions or features, or other device such as a server. In another aspect, the peripheral 322 may include a storage device such as a flash card, USB drive, or other solid-state device, or an optical drive, a magnetic drive, a disk drive, or other device or combination of devices suitable for bulk storage. More generally, any device or combination of devices suitable for use with the computing device 310 may be used as a peripheral 322 as contemplated herein.

Other hardware 326 may be incorporated into the computing device 310 such as a co-processor, a digital signal processing system, a math co-processor, a graphics engine, a video driver, a camera, a microphone, additional speakers, and so forth. The other hardware 326 may also or instead include expanded input/output ports, extra memory, additional drives, and so forth.

A bus 332 or combination of busses may serve as an electromechanical backbone for interconnecting components of the computing device 310 such as the controller 312, memory 314, network interface 316, other hardware 326, data store 318, and input/output interface. As shown in the figure, each of the components of the computing device 310 may be interconnected using a system bus 332 in a communicating relationship for sharing controls, commands, data, power, and so forth.

The computing device 310 is connected to a power source 360 to provide electrical power for the computing device to run.

The various illustrative logical blocks, modules and circuits described in connection with the present disclosure may be implemented or performed with one or more processors specially configured to perform the functions discussed in the present disclosure. Each processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing neuron models and models of neural systems. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein. In the distributed networked system described herein, a plurality of processors on a plurality of devices provide a plurality of nodes for the network.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate systems for performing the methods and techniques described herein can be downloaded and/or otherwise obtained by a user terminal and/or base station as applicable. For example, such a device can be coupled to a server to facilitate the transfer of computer applications for performing the methods described herein. Alternatively, various methods described herein can be provided via storage systems, such that a user terminal and/or base station can obtain the various methods upon coupling or providing the storage system to the device. Moreover, any other suitable technique for providing the methods and techniques described herein to a device can be utilized.

The computer program controls input and operation of the device. The computer program includes at least one code segment stored in or on a computer-readable medium residing on or accessible by the device for instructing the computing elements, and any other related components to operate in the manner described herein. The computer program is preferably stored within the memory and comprises an ordered listing of executable instructions for implementing logical functions in the device. However, the computer program may comprise programs and methods for implementing functions in the device that are not an ordered listing, such as hard-wired electronic components, programmable logic such as field-programmable gate arrays (FPGAs), application specific integrated circuits, or other similar or conventional methods for controlling the operation of electrical or other computing devices.

Similarly, the computer program may be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. The computer-readable medium may even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 4A:
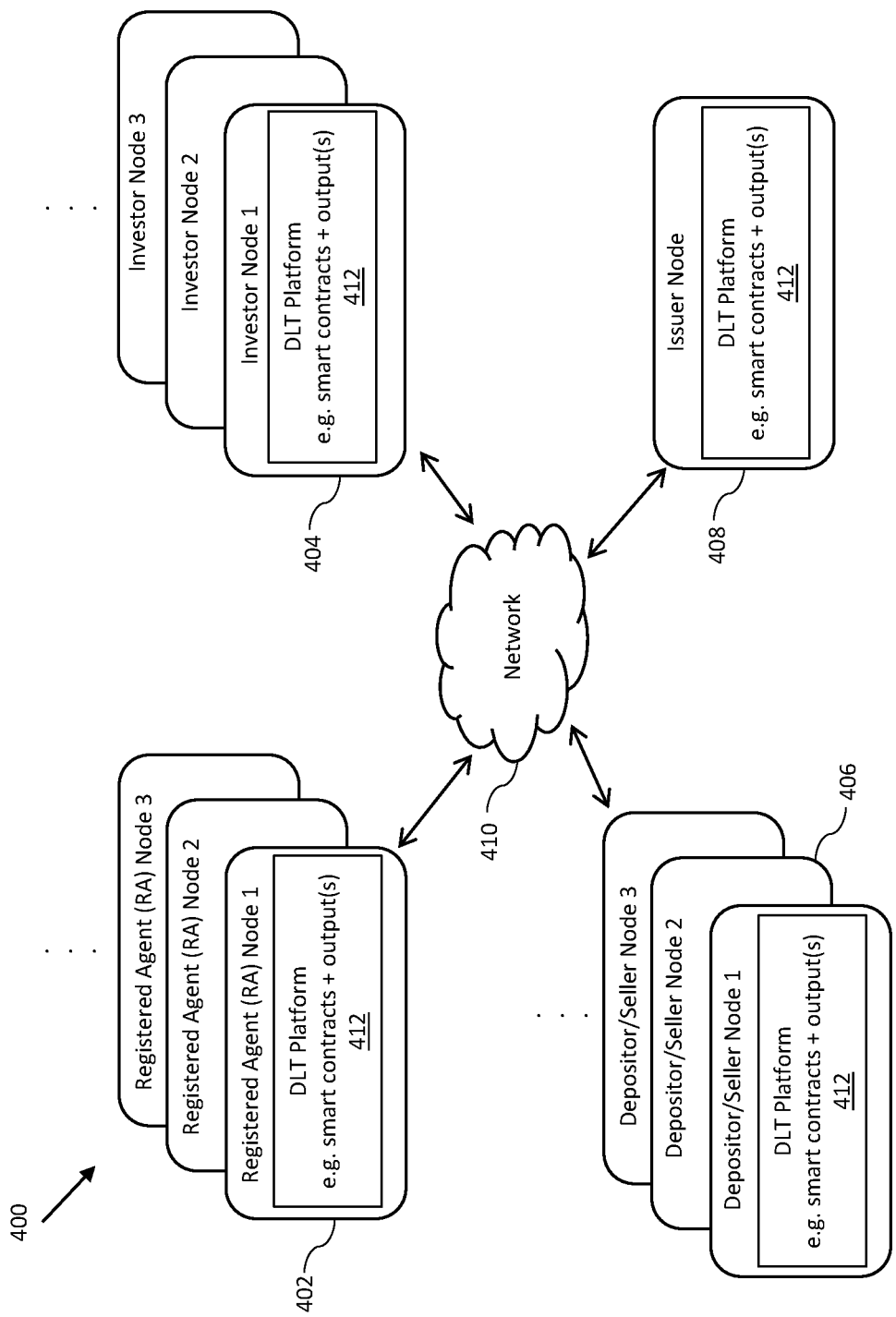
FIGS. 4A and 4B depict distributed networked systems for generating and managing fractionalized interests in digital assets such as fungible tokens according to embodiments of the disclosed subject matter.
Figure 4B:
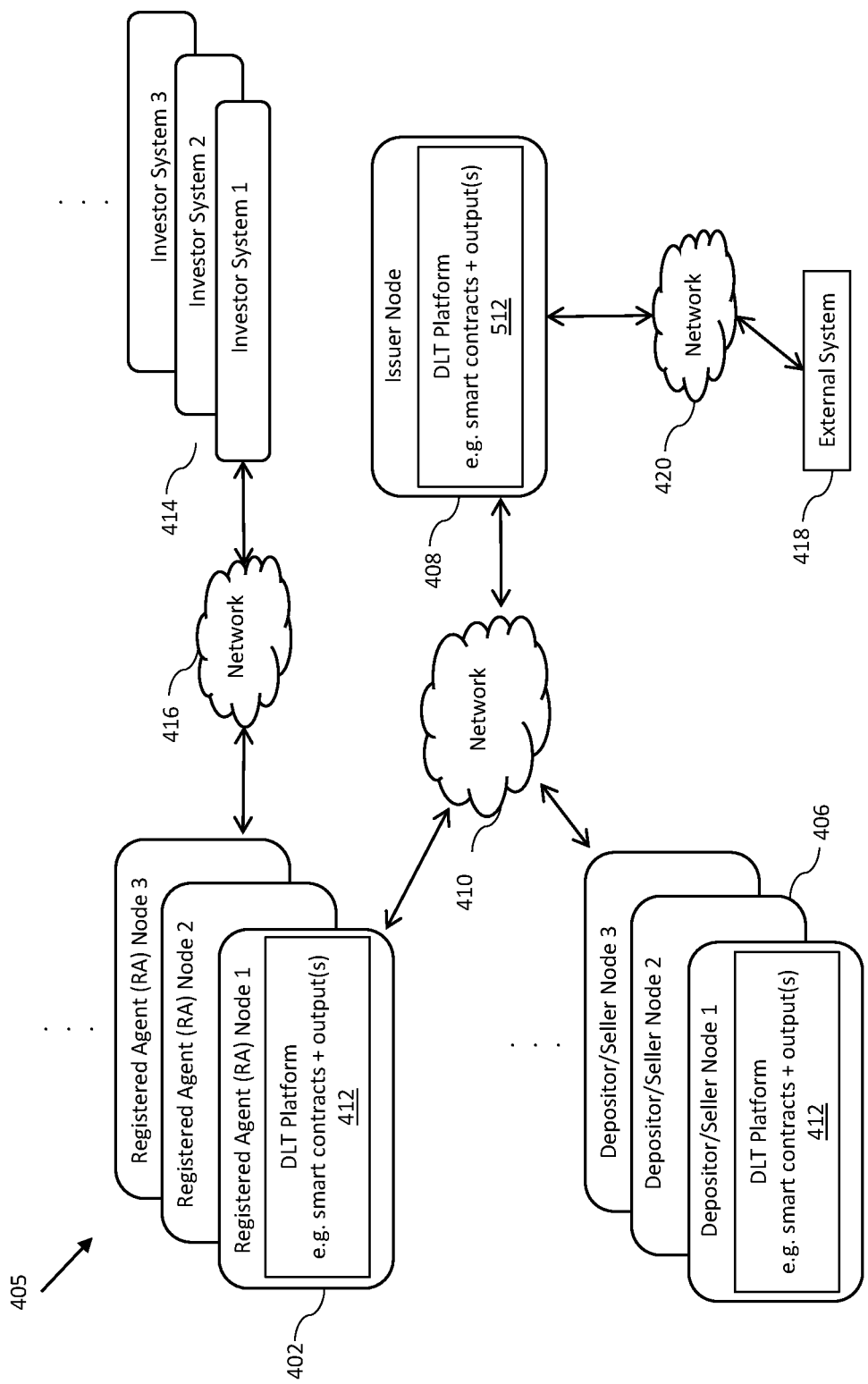

FIGS. 4A and 4B are schematic diagrams illustrating example embodiments of a system comprising nodes and users that may be involved in a smart system for creating and trading depositary tokens in a token trust model utilizing one or more smart contracts on a distributed ledger technology platform as described herein. A node is a connection point in a communications network and allow users to interact with the network. Each node is an endpoint for data transmissions or redistribution. Nodes have either a programmed or engineered capability to recognize, process and forward transmissions to other network nodes As illustrated in FIG. 4A, in some embodiments, a smart trading platform 400 can comprise one or more registered agent (RA) or dealer nodes 402, one or more investor nodes 404, one or more asset owner (depositor or seller of fungible tokens) nodes 406, and/or a central authority node 408, which can be in communication with one another through a network 410. The investor nodes 404 may be used by users (investors) subscribing to the platform to find and invest in tokens of interest to the investor. The owner (seller) nodes 406 are held by users who wish to deposit fungible tokens into the system. The central authority node 408 is held by the issuer of the depositary tokens. In some embodiments, one or more of the RA node(s) 402, investor node(s) 404, asset owner node(s) 406, and central authority node 408 can comprise nodes on a DLT platform 412 on which the smart platform, one or more smart contracts and smart contract outputs thereof, and/or one or more private data sharing channels may be implemented. In some embodiments, the DLT platform 412 can be configured to facilitate the filing, tracking, management, communications, notifications, or the like of the token trust as described herein. In some embodiments, the system 400 may also include an external system 418 as described below with regard to FIG. 4B.

As illustrated in FIG. 4B, in some embodiments of a token trust 405, one or more investor systems 414 may not comprise access to the DLT platform 412. Rather, the one or more investor systems 414 can be configured to communicate with one or more RA nodes 402 comprising a DLT platform 412 through a separate network 416, for example through an application programming interface ("API"). As such, in some embodiments, one or more investor systems 414 may not be on the DLT itself. For example, small individual investors may be able to purchase depositary tokens from a registered agent or dealer in the distributed network, who is authorized to negotiate terms and conditions of the smart contracts on behalf of small investors. The RA may negotiate the terms and conditions prior to or after engaging with investors not on the DLT itself. For example, the RA may offer depositary tokens for purchase by public investors in publicly available exchanges and/or buy depositary tokens for resale to other investors. Further, in some embodiments, a central authority node 408 can be configured to maintain a separate external system 418. In some embodiments, the separate external system 418 can be in communication with the central authority node 408 through a separate network connection 420, such as an API, for example for purposes of maintaining legally valid versions of securities based on the depositary tokens. In some embodiments, the smart filings on the DLT itself can be the legally valid and canonical version of the filings. In embodiments, the external system may also include modules for managing the system that are desirably kept separate from the distributed ledger. For example, owner confidential information and pre-issuance activities such as valuation of and administering depositary tokens (e.g. blocks 220 and 250 of FIGS. 2A and 2B) may be held in the separate external system. In other embodiments, the smart funding platform may comprise a combination of investors 404 with nodes on the distributed ledger and investors 414 without nodes on the distributed ledger.

The system and methods described herein may be used for private offerings, public offerings, or combinations thereof. For example, depositary tokens as described herein may be offered to a limited number of private capital entities. In other embodiments, the depositary tokens may be publicly traded.

Embodiments

Embodiment 1: A system for administering digital assets in a decentralized network, the system comprising a non-transitory computer readable medium and one or more processors, the system being configured to: receive, from a first depositor account, a first set of one or more fungible tokens; generate a smart contract configured to in response to receiving the first set of fungible tokens, generate a set of N1 fungible depositary tokens associated with the first set of fungible tokens, wherein N1 represents the number of depositary tokens collectively representing 100% of the ownership of the first set of fungible tokens; receive, from a first networked node, a first bid for one or more of the depositary tokens from a first investor; determine an amount of the depositary tokens to allocate to the first investor based on the first bid; allocate the amount of the depositary tokens to the first investor; wherein the system further comprises a distributed ledger for recording bids for the one or more of the depositary tokens and respective allocated depositary tokens, wherein the distributed ledger is accessible by the first networked node.

Embodiment 2: The system of Embodiment 1 wherein the first set of fungible tokens comprises a set of units of a cryptocurrency.

Embodiment 3: The system of Embodiment 1 wherein the smart contract is accessible to the first networked node, wherein the smart contract further comprises a payout triggering event; and a plurality of predetermined electronic actions for generating a smart contract output when the payout triggering event is met, wherein the smart contract generates a payout to a user automatically when the payout event is triggered; and wherein the execution of the smart contract is recorded to the distributed ledger.

Embodiment 4: The system of Embodiment 3, wherein the payout triggering event is based on revenue or income associated with monetization of the first set of fungible tokens.

Embodiment 5: The system of Embodiment 4, wherein the payout triggering event is based on sale of a depositary token representing fractional ownership of the first set of fungible tokens and the payout is income associated with the sale and is paid to a depositor of the first set of fungible tokens.

Embodiment 6: The system of Embodiment 4, wherein the payout triggering event is based on resale of a depositary token representing fractional ownership of the first set of fungible tokens by a first investor in the depositary token to another investor and the payout is income associated with the sale and is paid to the first investor.

Embodiment 7: The system of Embodiment 1, further comprising a distributed network of nodes wherein the one or more processors are configured to execute the program instructions to cause the computing system to: receive, from a plurality of networked nodes, a plurality of bids for one or more of the depositary tokens from a plurality of investors, determine an amount of the depositary tokens to allocate to each of the plurality of investors based on the respective bid from each of the plurality of investors; allocate the amount of depositary tokens to each of the plurality of investors; wherein the system further comprises a distributed ledger for recording bids for the one or more of the depositary tokens and respective allocated depositary tokens, wherein the distributed ledger is accessible by the plurality of networked nodes.

Embodiment 8: The system of Embodiment 1, wherein the system is further configured to receive a plurality of N″ additional sets of fungible tokens from a plurality of depositor accounts; generate a plurality of N″ smart contracts, each configured to in response to receiving an additional set of fungible tokens, generate N″ additional sets of fungible depositary tokens, each additional set of depositary tokens comprising a number of depositary tokens which collectively represent 100% of the ownership of each additional set of fungible tokens; to provide a plurality of sets of depositary tokens, each set of which represents one of the plurality of additional sets of fungible tokens.

Embodiment 9: The system of Embodiment 8 wherein each additional set of fungible tokens comprises a set of units of a cryptocurrency.

Embodiment 10: The system of Embodiment 8 wherein each smart contract further comprises a payout triggering event; and a plurality of predetermined electronic actions for generating a smart contract output when the payout triggering event is met, wherein the smart contract generates a payout to a user automatically when the payout event is triggered; and wherein the execution of the smart contract is recorded to the distributed ledger.

Embodiment 11: The system of Embodiment 8, wherein the system is further configured to aggregate the N1 depositary tokens and at least one set of N″ depositary tokens into a pool of depositary tokens; and generate a set of pooled depositary tokens, wherein each of the pooled depositary tokens comprises a fractionalized interest in the pool of depositary tokens representing a proportional amount of the N1 and N″ depositary tokens.

Embodiment 12: The system of Embodiment 11 wherein each smart contract further comprises a payout triggering event; and a plurality of predetermined electronic actions for generating a smart contract output when the payout triggering event is met, wherein the smart contract generates a payout to a user automatically when the payout event is triggered; and wherein the execution of the smart contract is recorded to the distributed ledger.

Embodiment 13: The system of Embodiment 12, wherein the payout triggering event is based on revenue or income associated with monetization of the first set of fungible tokens or any of the N″ additional sets of fungible tokens.

Embodiment 14: A non-transitory computer readable storage medium comprising program instructions embodied therewith; wherein the program instructions cause a distributed networked computer system for managing fungible tokens, the distributed network computer system comprising a distributed ledger and one or more processors configured to execute the program instructions to: receive, from a first depositor account, a first set of one or more fungible tokens; generate a smart contract configured to in response to receiving the first set of fungible tokens, generate a set of N1 fungible depositary tokens associated with the first set of fungible tokens, wherein N1 represents the number of depositary tokens collectively representing 100% of the ownership of the first set of fungible tokens; receive, from a first networked node, a first bid for one or more of the depositary tokens from a first investor; determine an amount of the depositary tokens to allocate to the first investor based on the first bid; allocate the amount of the depositary tokens to the first investor; wherein the system further comprises a distributed ledger for recording bids for the one or more of the depositary tokens and respective allocated depositary tokens, wherein the distributed ledger is accessible by the first networked node.

Embodiment 15: The non-transitory computer readable storage medium of Embodiment 14 wherein the first set of fungible tokens comprises a set of units of a cryptocurrency.

Embodiment 16: The non-transitory computer readable storage medium of Embodiment 14 wherein the smart contract is accessible to the first networked node, wherein the smart contract further comprises a payout triggering event; and a plurality of predetermined electronic actions for generating a smart contract output when the payout triggering event is met, wherein the smart contract generates a payout to a user automatically when the payout event is triggered; and wherein the execution of the smart contract is recorded to the distributed ledger.

Embodiment 17: The non-transitory computer readable storage medium of Embodiment 16, wherein the payout triggering event is based on revenue or income associated with monetization of the first set of fungible tokens.

Embodiment 18: The non-transitory computer readable storage medium of Embodiment 17, wherein the payout triggering event is based on sale of a depositary token representing fractional ownership of the first set of fungible tokens and the payout is income associated with the sale and is paid to a depositor of the first set of fungible tokens.

Embodiment 19: The non-transitory computer readable storage medium of Embodiment 17, wherein the payout triggering event is based on resale of a depositary token representing fractional ownership of the first set of fungible tokens by a first investor in the depositary token to another investor and the payout is income associated with the sale and is paid to the first investor.

Embodiment 20: The non-transitory computer readable storage medium of Embodiment 14, wherein the system further comprises a distributed network of nodes and wherein the one or more processors are configured to execute the program instructions to cause the computing system to: receive, from a plurality of networked nodes, a plurality of bids for one or more of the depositary tokens from a plurality of investors, determine an amount of the depositary tokens to allocate to each of the plurality of investors based on the respective bid from each of the plurality of investors; allocate the amount of depositary tokens to each of the plurality of investors; wherein the system further comprises a distributed ledger for recording bids for the one or more of the depositary tokens and respective allocated depositary tokens, wherein the distributed ledger is accessible by the plurality of networked nodes.

Embodiment 21: The non-transitory computer readable storage medium of Embodiment 14, wherein the one or more processors are configured to execute the program instructions to cause the computing system to receive a plurality of $N''$ additional sets of fungible tokens from a plurality of depositor accounts; generate a plurality of $N''$ smart contracts, each configured to in response to receiving an additional set of fungible tokens, generate $N''$ additional sets of fungible depositary tokens, each additional set of depositary tokens comprising a number of depositary tokens which collectively represent 100% of the ownership of each additional set of fungible tokens; to provide a plurality of sets of depositary tokens, each set of which represents one of the plurality of additional sets of fungible tokens.

Embodiment 22: The non-transitory computer readable storage medium of Embodiment 21 wherein each additional set of fungible tokens comprises a set of units of a cryptocurrency.

Embodiment 23: The non-transitory computer readable storage medium of Embodiment 21 wherein each smart contract further comprises a payout triggering event; and a plurality of predetermined electronic actions for generating a smart contract output when the payout triggering event is met, wherein the smart contract generates a payout to a user automatically when the payout event is triggered; and wherein the execution of the smart contract is recorded to the distributed ledger.

Embodiment 24: The non-transitory computer readable storage medium of Embodiment 21, wherein the system is further configured to aggregate the N1 depositary tokens and each set of $N''$ depositary tokens into a pool of depositary tokens; and generate a set of pooled depositary tokens, wherein each of the pooled depositary tokens comprises a fractionalized interest in the pool of depositary tokens representing a proportional amount of the N1 and $N''$ depositary tokens.

Embodiment 25: The non-transitory computer readable storage medium of Embodiment 24 wherein each smart contract further comprises a payout triggering event; and a plurality of predetermined electronic actions for generating a smart contract output when the payout triggering event is met, wherein the smart contract generates a payout to a user automatically when the payout event is triggered; and wherein the execution of the smart contract is recorded to the distributed ledger.

Embodiment 26: The non-transitory computer readable storage medium of Embodiment 25, wherein the payout triggering event is based on revenue or income associated with monetization of the first set of fungible tokens or any of the $N''$ additional sets of fungible tokens.

Embodiment 27: A method for administering digital assets in a decentralized network, the method comprising by a distributed network computer system comprising a distributed ledger; a non-transitory computer readable storage medium having program instructions embodied therewith; and one or more processors configured to execute the program instructions, the computer system receiving, from a first depositor account, a first set of one or more fungible tokens; generating a smart contract configured to in response to receiving the first set of fungible tokens, generate a set of N1 fungible depositary tokens associated with the first set of fungible tokens, wherein N1 represents the number of depositary tokens collectively representing 100% of the ownership of the first set of fungible tokens; receiving, from a first networked node, a first bid for one or more of the depositary tokens from a first investor; determining an amount of the depositary tokens to allocate to the first investor based on the first bid; allocating the amount of the depositary tokens to the first investor; recording bids for the one or more of the depositary tokens and respective allocated depositary tokens in the distributed ledger, wherein the distributed ledger is accessible by the first networked node.

Embodiment 28: The method of Embodiment 27 wherein the first set of fungible tokens comprises a set of units of a cryptocurrency.

Embodiment 29: The method of Embodiment 27 wherein the smart contract is accessible to the first networked node and the smart contract further comprises a payout triggering event; and a plurality of predetermined electronic actions for generating a smart contract output when the payout triggering event is met; generating by the smart contract a payout to a user automatically when the payout event is triggered; recording execution of the smart contract to the distributed ledger.

Embodiment 30: The method of Embodiment 29, wherein the payout triggering event is based on revenue or income associated with monetization of the first set of fungible tokens.

Embodiment 31: The method of Embodiment 30, wherein the payout triggering event is based on sale of a depositary token representing fractional ownership of the first set of fungible tokens and the payout is income associated with the sale and is paid to a depositor of the first set of fungible tokens.

Embodiment 32: The method of Embodiment 30, wherein the payout triggering event is based on resale of a depositary token representing fractional ownership of the first set of fungible tokens by a first investor in the depositary token to another investor and the payout is income associated with the sale and is paid to the first investor.

Embodiment 33: The method of Embodiment 27, wherein the computer system further comprises a distributed network of nodes, the computer system receiving, from a plurality of networked nodes, a plurality of bids for one or more of the depositary tokens from a plurality of investors, determining an amount of the depositary tokens to allocate to each of the plurality of investors based on the respective bid from each of the plurality of investors; allocating the amount of depositary tokens to each of the plurality of investors; wherein the system further comprises a distributed ledger for recording bids for the one or more of the depositary tokens and respective allocated depositary tokens, wherein the distributed ledger is accessible by the plurality of networked nodes.

Embodiment 34: The method of Embodiment 27, further comprising receiving a plurality of $N''$ additional sets of fungible tokens from a plurality of depositor accounts; generating a plurality of N" smart contracts, each configured to in response to receiving an additional set of fungible tokens, generate N" additional sets of fungible depositary tokens, each additional set of depositary tokens comprising a number of depositary tokens which collectively represent 100% of the ownership of each additional set of fungible tokens; providing a plurality of sets of depositary tokens, each set of which represents one of the plurality of additional sets of fungible tokens.

Embodiment 35: The method of Embodiment 34 wherein each additional set of fungible tokens comprises a set of units of a cryptocurrency.

Embodiment 36: The method of Embodiment 34 wherein each smart contract further comprises a payout triggering event; and a plurality of predetermined electronic actions for generating a smart contract output when the payout triggering event is met; generating by the smart contract a payout to a user automatically when the payout event is triggered; and recording execution of the smart contract is to the distributed ledger.

Embodiment 37: The method of Embodiment 34, further comprising aggregating the N1 depositary tokens and at least one set of N" depositary tokens into a pool of depositary tokens; and generating a set of pooled depositary tokens, wherein each of the pooled depositary tokens comprises a fractionalized interest in the pool of depositary tokens representing a proportional amount of the N1 and N" depositary tokens.

Embodiment 38: The method of Embodiment 37 wherein each smart contract further comprises a payout triggering event; and a plurality of predetermined electronic actions for generating a smart contract output when the payout triggering event is met, generating a payout to a user automatically when the payout event is triggered; and recording execution of the smart contract to the distributed ledger.

Embodiment 39: The method of Embodiment 38, wherein the payout triggering event is based on revenue or income associated with monetization of the first set of fungible tokens or any of the N" additional sets of fungible tokens.

Embodiment 40: A system for administering digital assets in a decentralized network, the system comprising a non-transitory computer readable medium, one or more processors, a distributed network of nodes and a distributed ledger accessible by the plurality of networked nodes, the system being configured to: receive a plurality of N" sets of fungible tokens from a plurality of depositor accounts; generate a plurality of N" smart contracts, each configured to in response to receiving one of the N" sets of fungible tokens, generate a set of fungible depositary tokens, each set of depositary tokens comprising a number of depositary tokens which collectively represent 100% of the ownership of each set of fungible tokens; to provide a plurality of N" sets of depositary tokens, each set of which represents one of the plurality of sets of N" fungible tokens; receive, from the plurality of networked nodes, a plurality of bids for one or more of the depositary tokens from a plurality of investors, determine an amount of the depositary tokens to allocate to each of the plurality of investors based on the respective bid from each of the plurality of investors; allocate the amount of depositary tokens to each of the plurality of investors; record bids for the one or more of the depositary tokens and respective allocated depositary tokens to the distributed ledger; wherein each smart contract further comprises defining a payout triggering event based on revenue or income associated with monetization of any of the N" sets of fungible tokens; and a plurality of predetermined electronic actions for generating a smart contract output when the payout triggering event is met, wherein the smart contract generates a payout to a user automatically when the payout event is triggered; and execution of the smart contract is recorded to the distributed ledger.

The invention claimed is:

1. A system for administering digital assets in a decentralized network, the system comprising a plurality of networked nodes, a non-transitory computer readable medium, a distributed ledger accessible by the plurality of the networked nodes, and one or more processors, the system being configured to:
receive, from a first depositor account, a first set of one or more fungible tokens and a plurality of N" additional sets of fungible tokens from a plurality of depositor accounts;
in response to receiving the first set of fungible tokens and the plurality of N" additional sets of fungible tokens, generate a plurality of smart contracts configured to
generate a set of N1 fungible depositary tokens associated with the first set of fungible tokens, wherein N1 represents the number of depositary tokens collectively representing 100% of the ownership of the first set of fungible tokens and generate a plurality of N" additional sets of fungible depositary tokens, each additional set of depositary tokens comprising a number of depositary tokens which collectively represent 100% of the ownership of each additional set of fungible tokens;
aggregate the N1 depositary tokens and at least one set of the additional depositary tokens into a pool of depositary tokens; and
generate a set of pooled depositary tokens, wherein each of the pooled depositary tokens comprises a fractionalized interest in the pool of depositary tokens representing a proportional amount of the N1 and the at least one set of the additional depositary tokens;
provide a plurality of sets of pooled depositary tokens, each set of which represents one of the plurality of additional sets of fungible tokens;
receive, from a first networked node, a first bid for one or more of the pooled depositary tokens from a first investor;
determine an amount of the pooled depositary tokens to allocate to the first investor based on the first bid;
allocate the amount of the pooled depositary tokens to the first investor;
wherein the distributed ledger is configured for recording bids for the one or more of the depositary tokens and respective allocated pooled depositary tokens, wherein the distributed ledger is accessible by the first networked node.

2. The system of claim 1 wherein the first set of fungible tokens comprises a set of units of a cryptocurrency.

3. The system of claim 1 wherein the smart contract is accessible to the first networked node, wherein the smart contract further comprises
a payout triggering event; and
a plurality of predetermined electronic actions for generating a smart contract output when the payout triggering event is met, wherein the smart contract generates a payout to a user automatically when the payout event is triggered;
and wherein the execution of the smart contract is recorded to the distributed ledger.

4. The system of claim 3, wherein the payout triggering event is based on revenue or income associated with monetization of the first set of fungible tokens.

5. The system of claim 4, wherein the payout triggering event is based on sale of a pooled depositary token representing fractional ownership of the first set of fungible tokens and the payout is income associated with the sale and is paid to a depositor of the first set of fungible tokens.

6. The system of claim 4, wherein the payout triggering event is based on resale of a pooled depositary token representing fractional ownership of the first set of fungible tokens by a first investor in the depositary token to another investor and the payout is income associated with the sale and is paid to the first investor.

7. The system of claim 1, wherein the one or more processors are configured to execute the program instructions to cause the computing system to:
   receive, from the plurality of the networked nodes, a plurality of bids for one or more of the pooled depositary tokens from a plurality of investors,
   determine an amount of the pooled depositary tokens to allocate to each of the plurality of investors based on the respective bid from each of the plurality of investors;
   allocate the amount of pooled depositary tokens to each of the plurality of investors.

8. The system of claim 1 wherein each additional set of fungible tokens comprises a set of units of a cryptocurrency.

9. The system of claim 1 wherein each smart contract further comprises a payout triggering event; and
   a plurality of predetermined electronic actions for generating a smart contract output when the payout triggering event is met, wherein the smart contract generates a payout to a user automatically when the payout event is triggered;
   wherein the payout triggering event is based on sale of a pooled depositary token representing fractional ownership of the at least one set of the additional fungible tokens and the payout is income associated with the sale and is paid to a depositor of the at least one set of the additional fungible tokens; and wherein the execution of the smart contract is recorded to the distributed ledger.

10. The system of claim 1 wherein each
    smart contract further comprises a payout triggering event; and
    a plurality of predetermined electronic actions for generating a smart contract output when the payout triggering event is met, wherein the smart contract generates a payout to a user automatically when the payout event is triggered;
    wherein the payout triggering event is based on resale of a pooled depositary token representing fractional ownership of the at least one set of the additional fungible tokens by a first investor in the depositary token to another investor and the payout is income associated with the sale and is paid to the first investor;
    and wherein the execution of the smart contract is recorded to the distributed ledger.

11. The system of claim 10, wherein the payout triggering event is based on revenue or income associated with monetization of the first set of fungible tokens or any of the $N'''$ additional sets of fungible tokens.

12. A non-transitory computer readable storage medium comprising program instructions embodied therewith;
    wherein the program instructions cause a distributed networked computer system for managing fungible tokens, the distributed network computer system comprising a distributed network of a plurality of networked nodes, a distributed ledger and one or more processors configured to execute the program instructions to:
    receive, from a first depositor account, a first set of one or more fungible tokens;
    receive a plurality of $N'''$ additional sets of fungible tokens from a plurality of depositor accounts;
    generate a smart contract configured to
    in response to receiving the first set of fungible tokens and the plurality of $N'''$ additional sets of fungible tokens, generate a set of N1 fungible depositary tokens associated with the first set of fungible tokens, wherein N1 represents the number of depositary tokens collectively representing 100% of the ownership of the first set of fungible tokens;
    generate $N'''$ additional sets of fungible depositary tokens, each additional set of depositary tokens comprising a number of depositary tokens which collectively represent 100% of the ownership of each additional set of fungible tokens;
    provide a plurality of sets of $N''$ depositary tokens, each set of which represents one of the plurality of additional sets of fungible tokens;
    aggregate the N1 depositary tokens and at least one set of the $N''$ depositary tokens into a pool of depositary tokens; and
    generate a set of pooled depositary tokens, wherein each of the pooled depositary tokens comprises a fractionalized interest in the pool of depositary tokens representing a proportional amount of the N1 and the at least one set of the $N''$ depositary tokens;
    receive, from a first networked node, a first bid for one or more of the pooled depositary tokens from a first investor;
    determine an amount of the pooled depositary tokens to allocate to the first investor based on the first bid;
    allocate the amount of the pooled depositary tokens to the first investor;
    wherein the distributed ledger is configured for recording bids for the one or more of the pooled depositary tokens and respective allocated pooled depositary tokens, wherein the distributed ledger is accessible by the first networked node;
    wherein the smart contract is accessible to the first networked node, wherein the smart contract further comprises
    a payout triggering event; and
    a plurality of predetermined electronic actions for generating a smart contract output when the payout triggering event is met, wherein the smart contract generates a payout to a user automatically when the payout event is triggered;
    and wherein the execution of the smart contract is recorded to the distributed ledger.

13. The non-transitory computer readable storage medium of claim 12, wherein the one or more processors are configured to execute the program instructions to cause the computing system to:
    receive, from at least one of the plurality of networked nodes, bids for one or more of the pooled depositary tokens from a plurality of investors,
    determine an amount of the pooled depositary tokens to allocate to each of the plurality of investors based on the respective bid from each of the plurality of investors;
    allocate the amount of pooled depositary tokens to each of the plurality of investors;

wherein the distributed ledger is accessible by the plurality of networked nodes.

14. A method for administering digital assets in a decentralized network comprising a plurality of networked nodes, the method comprising
by a distributed network computer system comprising a distributed ledger; a non-transitory computer readable storage medium having program instructions embodied therewith;
and one or more processors configured to execute the program instructions, the computer system receiving, from a first depositor account, a first set of one or more fungible tokens;
receiving a plurality of $N''$ additional sets of fungible tokens from a plurality of depositor accounts;
generating a smart contract configured to
in response to receiving the first set of fungible tokens and the plurality of $N''$ additional sets of fungible tokens, generate a set of N1 fungible depositary tokens associated with the first set of fungible tokens, wherein N1 represents the number of depositary tokens collectively representing 100% of the ownership of the first set of fungible tokens and generate $N''$ additional sets of fungible depositary tokens, each additional set of depositary tokens comprising a number of depositary tokens which collectively represent 100% of the ownership of each additional set of fungible tokens;
aggregate the N1 depositary tokens and at least one set of the $N''$ depositary tokens into a pool of depositary tokens; and
generate a set of pooled depositary tokens, wherein each of the pooled depositary tokens comprises a fractionalized interest in the pool of depositary tokens representing a proportional amount of the N1 and the at least one set of the $N''$ depositary tokens;
receiving, from a first networked node, a first bid for one or more of the depositary tokens from a first investor;
determining an amount of the depositary tokens to allocate to the first investor based on the first bid;
allocating the amount of the depositary tokens to the first investor;
recording bids for the one or more of the depositary tokens and respective allocated depositary tokens in the distributed ledger, wherein the distributed ledger is accessible by the first networked node; wherein the smart contract is accessible to the first networked node and the smart contract further comprises
a payout triggering event; and
a plurality of predetermined electronic actions for generating a smart contract output when the payout triggering event is met;
generating by the smart contract a payout to a user automatically when the payout event is triggered; and
recording execution of the smart contract to the distributed ledger.

15. The method of claim 14,
the computer system
receiving, from the plurality of the networked nodes, a plurality of bids for one or more of the pooled depositary tokens from a plurality of investors,
determining an amount of the pooled depositary tokens to allocate to each of the plurality of investors based on the respective bid from each of the plurality of investors;
allocating the amount of pooled depositary tokens to each of the plurality of investors;
wherein the system further comprises a distributed ledger for recording bids for the one or more of the pooled depositary tokens and respective allocated pooled depositary tokens, wherein the distributed ledger is accessible by the plurality of networked nodes.

16. A system for administering digital assets in a decentralized network, the system comprising a non-transitory computer readable medium, one or more processors, a distributed network of nodes and a distributed ledger accessible by the plurality of networked nodes, the system being configured to:
receive a plurality of $N''$ sets of fungible tokens from a plurality of depositor accounts;
generate a plurality of smart contracts, each configured to
in response to receiving each of the $N''$ sets of fungible tokens, generate a plurality of sets of fungible depositary tokens, each set of depositary tokens comprising a number of depositary tokens which collectively represent 100% of the ownership of each set of fungible tokens;
provide a plurality of $N''$ sets of depositary tokens, each set of which represents one of the plurality of sets of $N''$ fungible tokens;
aggregate a selection of two or more of the $N''$ sets of the depositary tokens into a pool of depositary tokens;
generate a set of pooled depositary tokens, wherein each of the pooled depositary tokens comprises a fractionalized interest in the pool of depositary tokens representing a proportional amount of the two or more sets of depositary tokens;
receive, from the plurality of networked nodes, a plurality of bids for one or more of the pooled depositary tokens from a plurality of investors,
determine an amount of the pooled depositary tokens to allocate to each of the plurality of investors based on the respective bid from each of the plurality of investors;
allocate the amount of pooled depositary tokens to each of the plurality of investors; record bids for the one or more of the pooled depositary tokens and respective allocated pooled depositary tokens to the distributed ledger;
wherein each smart contract further comprises defining a payout triggering event based on revenue or income associated with monetization of any of the $N''$ sets of fungible tokens; and a plurality of predetermined electronic actions for generating a smart contract output when the payout triggering event is met, wherein the smart contract generates a payout to a user automatically when the payout event is triggered; and
execution of the smart contract is recorded to the distributed ledger.

* * * * *